Patented June 17, 1947

2,422,632

UNITED STATES PATENT OFFICE 2,422,632

MANUFACTURE OF ALIPHATIC AMINES AND ACID AMIDES

John F. Olin and Thomas E. Deger, Grosse Ile, Mich., assignors to Sharples Chemicals Inc., Philadelphia, Pa., a corporation of Delaware No Drawing. Application November 7, 1944, Serial No. 562,382

8 Claims. (Cl. 260—561)

This application is a continuation in part of our copending application Serial No. 416,463, filed October 25, 1941.

The present invention pertains to the manufacture of aliphatic amines and acid amides, and provides a procedure by which such compounds may be very economically produced by using, as the source of the alkyl radical of the desired compound, an olefin hydrocarbon.

The prior art teaches that aliphatic acids may be obtained by reacting carbon monoxide with an olefin and steam, and it also teaches that ammonia may be reacted with carbon monoxide to produce formamide. Insofar as known to us, however, the invention of the present application represents the first suggestion of a process by which an olefin may be reacted with carbon monoxide and ammonia or an amine having replaceable hydrogen to form an amide or amine.

In the practice of the invention to produce acid amides, the reactions by which the amides are formed may be represented by the following equation:

I. 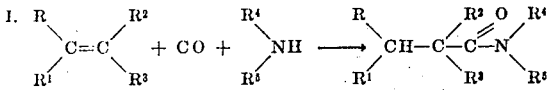

in which R, $R^1$, $R^2$ and $R^3$ may be hydrogen or any alkyl radical and $R^4$ and $R^5$ may be hydrogen or any aliphatic, cyclo-aliphatic, heterocyclic or aromatic radical substituted for hydrogen of ammonia to form an amine. As will be seen from the above equation, the aminating agent may be either ammonia or an amine. If ammonia is used, the amide formed by the reaction will be a primary amide, but if an amine is used, a secondary or tertiary amide will be formed, having the organic radicals of the amine attached to the nitrogen atom of the amide.

The amide formed by Equation I may be subjected to hydrogenation in a manner known per se to form an amine, as illustrated by the following equation:

II. 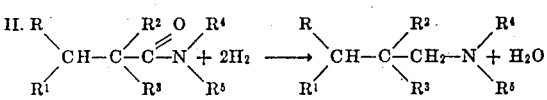

Thus, it will be seen that if an aliphatic amine is the desired final product, the invention may be practiced by first reacting the olefin to be aminated with carbon monoxide and the aminating agent to produce a reaction mixture containing the desired amide in accordance with Equation I, and thereafter introducing hydrogen into the resulting reaction mixture to effect hydrogenation in accordance with Equation II.

In a separate application, Serial Number 562,381 (Case 186), filed of even date herewith, we are claiming a related invention in which the hydrogen is introduced initially, with the primary object of forming an amine.

In the amidation and amination of olefin hydrocarbons containing between 2 and 10 carbon atoms, the reaction of Equation I will ordinarily be conducted in the vapor phase. The reaction of Equation II may be conducted either in the liquid or vapor phase, depending upon the critical temperature of the amide to be hydrogenated. In connection with discussion of the hydrogenation of the amide, it should be pointed out that a part of the initially formed amide may be dehydrated to form the corresponding nitrile. This formation of nitrile does not prevent effective performance of the process to obtain the ultimately desired amine, however, since the nitrile can be hydrogenated to form an amine in the same manner that the amide can be hydrogenated. In the discussion of the formation of the amide and subsequent hydrogenation thereof in this application, we accordingly intend to include operations involving dehydration of the amide to form a nitrile and hydrogenation of the nitrile or mixtures of nitrile and amide, since both reactions may be conducted simultaneously by hydrogenation of a mixture containing both nitriles and amides.

The invention may be practiced by either batch or continuous operation. In case it is conducted batchwise, the reactants are pumped into an autoclave and intimately mixed by stirring, while they are heated to a temperature capable of promoting reaction under pressure.

In the preferred practice of the invention, the reaction by which the desired amide or amine is produced is accomplished by heating the reactants, after mixing them with each other, to the reaction temperature during stream flow of the mixture through a heating apparatus. Thus, in the manufacture of amides or amines from olefins containing between two and ten carbon atoms, the carbon monoxide, ammonia or aminating amine and olefin may be passed into confluence with each other and preheated to a temperature somewhat below the reaction temperature while being thoroughly mixed together by flow through the preheater. They are then passed from this preheater through a reaction chamber which may be heated to a temperature within the range between 250 and 450° C., the preferred range of temperatures for this reaction by either batch procedure or continuous operation being between 325° C. and 375° C., depending upon the particular hydrocarbon under treatment, the space velocity, the ratio of reactants, the aminating agent and the catalyst used to promote the reaction.

Hydrogen may be introduced into the reaction mixture after the formation of amide has been substantially completed, or at an intermediate stage of the reaction in accordance with Equation I; i. e., before this reaction has proceeded to the right to the maximum degree attainable. Thus, the hydrocarbon first reacts with the carbon monoxide and aminating agent to form the amide, and this amide is thereafter hydrogenated by introduction of the hydrogen after substantial formation of amide has already occurred.

It will be evident from inspection of Equation I that the reaction by which the amide is obtained is essentially a condensation reaction, involving formation of a smaller number of molecules than the number of molecules entering into the reaction. It will thus be evident, from the well known law of Le Chatelier, that application of substantial super-atmospheric pressure will favor the progress of the reaction in the desired direction, and the preferred practice of the invention therefore involves application of high pressures, regardless of whether batch or continuous operation is employed. Pressures of from 500 to 20,000 lbs. per square inch or even higher may be employed to advantage in the practice of the invention, the only upper limit being that imposed by cost of compression and of apparatus capable of withstanding extremely high pressures. The formation of the desired amide is also favored to an even greater extent, in cases in which the resultant amide may be liquefied by the application of pressure, since the application of pressures sufficient to effect liquefaction in such instances strongly favors the formation of the desired product.

The olefin used in the practice of the invention may be obtained from any desired source, and it is not necessary that a relatively pure olefin be employed, as mixtures of olefins can be simultaneously treated in the practice of the invention to form mixtures of various amides and amines in which these compounds contain one more carbon atom than the respective olefins from which they are formed. Mixtures of olefins and paraffins may also be used, the paraffins acting as an inert diluent. The olefin may be obtained, for example, from gases resulting from cracking of petroleum, or it may be obtained by successive steps of halogenating a paraffin hydrocarbon or hydrocarbon fraction and dehydrohalogenating the resulting halogen derivative or halogenated fraction. An excellent source of the amyl radical, for example, consists in amylenes obtained as by-products in the chlorination of pentane or in the ensuing hydrolysis of the resulting amyl chloride. Olefins containing between 2 and 5 carbon atoms, such as ethylene, propylene, butylene or amylene separated from gases obtained in cracking petroleum are particularly useful in the practice of the invention. A certain amount of formamide will be formed in the practice of the invention by condensation of the carbon monoxide with the ammonia, and this formamide will be hydrogenated to form methyl amine in case the reaction mixture is subjected to hydrogenation. A part of this methyl amine will react with other constituents of the reaction mixture to form secondary or tertiary amines containing methyl radicals.

In the preferred practice of the invention, catalysts are used to speed up the reaction. Many catalysts are useful for this purpose, catalysts of the dehydrating type being preferred. Thus, phosphoric acid and its metallic salts, halide salts of metals of groups 1, 2 and 7 of the periodic series, molybdic acid, tungstic acid, phosphomolybdic acid, phospho-tungstic acid, silicotungstic acid, vanadic acid and salts of the above acids from metals of group 2 of the periodic series, iron oxide, cobalt oxide, or oxides of metals of groups 2 and 3 of the periodic series may be usefully employed in this reaction. These catalysts may be used alone, or they may be employed in connection with suitable catalyst supports, such as activated charcoal, Activated Alumina, acid activated clays or silica gel. If the amide-containing reaction mixture is later hydrogenated, any catalyst known to promote hydrogenation reactions may be used for this subsequent hydrogenation, such as the various catalysts heretofore employed for manufacture of amines by a process including hydrogenation from acids, esters, ketones, aldehydes, amides or alcohols. Preferred catalysts for accomplishment of this function are finely divided nickel, platinum, palladium, copper, reduced copper chromate or reduced nickel chromate. The amide may first be formed in the absence of hydrogen by reaction during continuous flow of the reactants, the olefin, carbon monoxide and ammonia being first passed under pressure over or through one of the dehydrating catalysts discussed above, and hydrogen may thereafter be introduced into the resulting amide-containing mixture, and the flow of the mixture resulting from addition of the hydrogen be continued over or through a second body of catalyst containing the hydrogenating catalyst.

The invention as discussed above may be carried out in a stainless steel jacketed tubular preheater followed by a similarly jacketed stainless steel reactor through which the reactants flow from the preheater. A suitable heat transfer medium is passed through the jackets of the preheater and reactor during the preliminary stages of the operation in order to bring the catalyst mass up to the desired reaction temperature, and to heat the gases to be reacted. The reactants which may be easily liquefied are passed into the preheating and reaction zones by conventional chemical proportioning pumps, while the gases which are more difficult to condense, such as carbon monoxide and the lower olefins such as ethylene or propylene are proportioned into the continuous treating apparatus by double or triple stage compressors. The reactants enter at one end of the reactor, after being preheated, and are then passed through or across the catalyst mass and leave the other end of the reactor.

While the particular ratio of reactants is not critical to the accomplishment of the process of the invention, best results are obtained in cases in which the carbon monoxide is present in the reaction mixture in substantial excess of the ammonia, and the ammonia is present in substantial excess of the olefin. It is preferable that the carbon monoxide be present in a molecular ratio to olefin which is at least as great as 10:1, and a molecular ratio to ammonia which is at least as great as 10:2.

If the reaction mixture is later hydrogenated, it is desirable that the hydrogen be present in the subsequent hydrogenation reaction in a substantial molecular excess over the amide to be hydrogenated.

While space velocity does not play a critical part in the invention, the preferred practice of the invention involves use of space velocities between 1000 and 7000 cu. ft. of reactant gas mixture per cu. ft. of catalyst per hour. The particular space velocity employed will, of course, depend on the various other conditions of the reaction, as discussed above.

While the invention has been described in connection with hydrogenation by continuous flow of the reactants, it is not necessary that the treatment of the amide or amide-containing reaction mixture be accomplished during continuous flow of that reaction mixture as discussed above. It is possible, for example, to effect hydrogenation of this mixture by known batch procedure for hydrogenation of amides, or the amide may be separated at this stage of the operation from the other reaction products and subjected to uses other than the formation of amine, or converted into an amine in an entirely separate operation.

The following examples illustrate the practice of the process.

Example I

An activated carbon catalyst impregnated with phosphoric acid is placed in a stainless steel catalyst chamber of approximately two cubic feet capacity. After activating the catalyst at 250° C. with ammonia for two hours at atmospheric pressure, a mixture of gases in the following mole ratio is passed into the system. 20 carbon monoxide : 6 ammonia : 1 ethylene at a space velocity of 1500 reactor temperature of 360–370° C. and pressure of 1500 pounds per square inch. On working up the crude product by distillation one of the fractions is propionamide, boiling between 110 to 120° C. at 17 mm. pressure.

Example II

In the same apparatus as described in Example I is placed a silica gel catalyst impregnated with approximately 1% each of thorium oxide, sodium chloride and manganese phosphate. After activating the catalyst at 250° C. with ammonia for two hours at atmospheric pressure, a mixture of gases in the following mole ratio is passed into the system, 20 carbon monoxide : 6 methylamine : 1 ethylene at a space velocity of 2000, reactor temperature of 350–360° C. and pressure of 2000 pounds per square inch. On working up the crude product by distillation one of the fractions is N-methylpropionamide.

Example III

In the same apparatus as described in Example I is placed an activated carbon catalyst support impregnated with approximately 1% each of manganese oxide, phosphomolybdic acid and copper chromite. After activating the catalyst at 300° C. with ammonia and hydrogen for two hours at atmospheric pressure, a mixture of gases in the following mole ratio is passed into the system, 20 carbon monoxide : 6 ammonia : 1 propylene at a space velocity of 1500, reactor temperature of 325–340° C. and pressure of 5000 pounds per square inch. On working up the crude product by distillation one of the fractions is isobutyramide boiling at 219–223° C.

Example IV

In a double reactor set up in series is placed an activated carbon catalyst impregnated with approximately 1% each of phosphomolybdic acid, molybdenum oxide, titanium oxide and sodium chloride in the first reactor and pelleted nickel catalyst in the second reactor. A mixture of 2 parts ammonia and 1 part hydrogen is passed over the catalysts for 2 hours at 250° C. for activating the catalysts. The reaction is then carried out by introducing a mixture of the following mole ratios into the first reactor, 30 carbon monoxide : 5 ammonia : 1 propylene. The temperature in this reactor is 330–340° C., pressure 8000 pounds per square inch and space velocity 2000. The hot reaction product is then mixed with preheated hydrogen in a ratio of 10 hydrogen to 1 propylene from the original mixture. This mixture then passes through the second reactor at 275–285° C. On working up the crude product by distillation one of the fractions is isobutylamine.

While the above discussion pertains principally to use of open chain olefins, cycloaliphatic olefins such as cyclohexene may also be used to form cycloaliphatic amides and amines in the practice of the invention.

Modifications will be obvious to those skilled in the art, and we do not therefore wish to be limited except by the scope of the following claims.

We claim:

1. The process of manufacturing aliphatic amides which comprises mixing together an olefin, carbon monoxide and an aminating agent chosen from the class consisting of ammonia and primary and secondary amines, and passing the resulting mixture over a heated dehydration catalyst to form the desired amide.

2. The process of manufacturing aliphatic amides which comprises mixing together an olefin, carbon monoxide and an aminating agent chosen from the class consisting of ammonia and primary and secondary amines, and passing the resulting mixture over a dehydration catalyst at a temperature between 250 and 450° C. to form the desired amide.

3. The process of manufacturing aliphatic amides which comprises mixing together an olefin, carbon monoxide and an aminating agent chosen from the class consisting of ammonia and primary and secondary amines, and passing the resulting mixture over a dehydration catalyst at a temperature between 250 and 450° C. and a pressure above 500 pounds per square inch to form the desired amide.

4. The process of manufacturing aliphatic amides which comprises mixing together an olefin, carbon monoxide and an aminating agent chosen from the class consisting of ammonia and primary and secondary amines, and passing the resulting mixture over a dehydration catalyst at a temperature between 325 and 375° C. and a pressure above 500 pounds per square inch to form the desired amide.

5. A process as defined in claim 1, in which the olefin contains between 2 and 10 carbon atoms.

6. A process as defined in claim 1, in which the olefin contains between 2 and 5 carbon atoms.

7. A process as defined in claim 1, in which the aminating agent is ammonia.

8. The process of manufacturing an aliphatic amide which comprises mixing together an olefin, carbon monoxide and an aminating agent chosen from the class consisting of ammonia and primary and secondary amines, and contacting said mixture in the vapor phase at a temperature between 250 and 450° C. with a dehydration catalyst to form the desired amide.

JOHN F. OLIN.
THOMAS E. DEGER.

REFERENCES CITED

The following references are of record in the file of this patent:

UNITED STATES PATENTS

| Number | Name | Date |
|---|---|---|
| 1,562,480 | Wietzel et al. | Nov. 24, 1925 |
| 1,698,602 | Mittasch | Jan. 8, 1929 |
| 1,532,428 | Meyer | Apr. 7, 1925 |
| 2,165,515 | Schmidt | July 11, 1939 |
| 2,166,150 | Howk | July 18, 1939 |
| 2,049,467 | Mnookin | Aug. 4, 1936 |
| 2,160,058 | Covert | May 30, 1939 |

FOREIGN PATENTS

| Number | Country | Date |
|---|---|---|
| 208,253 | Switzerland | April 1940 |
| 479,079 | Germany | Sept. 20, 1930 |